(12) United States Patent
Kitzmüller et al.

(10) Patent No.: US 12,319,324 B2
(45) Date of Patent: Jun. 3, 2025

(54) METHOD AND DEVICE FOR DETECTING A DERAILED STATE OF A RAIL VEHICLE

(71) Applicant: Siemens Mobility Austria GmbH, Vienna (AT)

(72) Inventors: Christian Kitzmüller, Graz (AT); Andreas Koller, Sankt Marein bei Knittelfeld (AT); Johannes Simon, Graz (AT)

(73) Assignee: Siemens Mobility Austria GmbH, Vienna (AT)

( * ) Notice: Subject to any disclaimer, the term of this patent is extended or adjusted under 35 U.S.C. 154(b) by 978 days.

(21) Appl. No.: 17/288,667

(22) PCT Filed: Oct. 24, 2019

(86) PCT No.: PCT/EP2019/079061
§ 371 (c)(1),
(2) Date: Apr. 26, 2021

(87) PCT Pub. No.: WO2020/089035
PCT Pub. Date: May 7, 2020

(65) Prior Publication Data
US 2021/0394805 A1 Dec. 23, 2021

(30) Foreign Application Priority Data
Oct. 31, 2018 (AT) .................................. 50936/2018

(51) Int. Cl.
*B61F 9/00* (2006.01)
*B61K 9/12* (2006.01)
(Continued)

(52) U.S. Cl.
CPC ................ *B61F 9/005* (2013.01); *B61K 9/12* (2013.01); *B61L 15/0027* (2013.01);
(Continued)

(58) Field of Classification Search
CPC ............. B61L 15/0081; B61L 15/0027; B61L 25/021; B61L 27/04; B61L 27/57;
(Continued)

(56) References Cited

U.S. PATENT DOCUMENTS 3,994,459 A * 11/1976 Miller ..................... B61F 9/005
246/DIG. 1
6,411,870 B1 * 6/2002 Sato ........................ B60T 7/124
701/19

(Continued)

FOREIGN PATENT DOCUMENTS

CN 1787941 6/2006
CN 204055812 U 12/2014
(Continued)

OTHER PUBLICATIONS

PCT International Search Report dated Feb. 13, 2020 based on PCT/EP2019/079061 filed Oct. 24, 2019.

*Primary Examiner* — Zachary L Kuhfuss
(74) *Attorney, Agent, or Firm* — Cozen O'Connor (57) ABSTRACT

A method and device for detecting a derailment state of a rail vehicle, wherein at least one kinematic variable is respectively measured via first and second sensors with respect to first and second wheelset end portions and corresponding measurement signals are formed, processed and evaluated, where values of first and second falling velocities y with respect to the first and second wheelset end portions are respectively calculated from the measurement signals via a computing unit and a derailment state of the rail vehicle is detected via a first comparison operation of the first falling velocity and the second falling velocity with a first falling velocity limit value and a second falling velocity limit value, which has a greater magnitude than the first falling velocity (Continued)

limit value such that a high level of certainty in the detection of derailment states is achieved.

21 Claims, 2 Drawing Sheets

(51) Int. Cl.
*B61L 15/00* (2006.01)
*B61L 25/02* (2006.01)
*B61L 27/57* (2022.01)
*B61L 27/70* (2022.01)
*G01M 17/08* (2006.01)
*B61K 13/00* (2006.01)

(52) U.S. Cl.
CPC ......... *B61L 15/0081* (2013.01); *B61L 25/021* (2013.01); *B61L 27/57* (2022.01); *B61L 27/70* (2022.01); *G01M 17/08* (2013.01); *B61K 13/00* (2013.01)

(58) Field of Classification Search
CPC ........... B61L 27/70; B61K 9/12; B61K 13/00; G01M 17/08; B61F 9/005

USPC ........................................................ 246/170
See application file for complete search history.

(56) References Cited

U.S. PATENT DOCUMENTS

| 7,937,192 B2 | 5/2011 | Lueger et al. |
| 2006/0122745 A1* | 6/2006 | Lueger ................... B61K 13/00 701/19 |
| 2011/0231039 A1* | 9/2011 | Leitel ..................... B60T 8/329 701/19 |

FOREIGN PATENT DOCUMENTS

| DE | 19953677 | 6/2001 | |
| DE | 19953677 C1 * | 6/2001 | ............... B61F 9/00 |
| DE | 69828316 D1 | 1/2005 | |
| EP | 1104734 | 6/2001 | |
| EP | 1236633 | 9/2002 | |
| EP | 1400427 | 3/2004 | |
| JP | H0939790 | 2/1997 | |
| WO | 2004009420 | 1/2004 | |
| WO | 2004101343 | 11/2004 | |
| WO | WO-2012140073 A1 * | 10/2012 | ............. B61F 9/005 |

* cited by examiner

METHOD AND DEVICE FOR DETECTING A DERAILED STATE OF A RAIL VEHICLE

CROSS-REFERENCE TO RELATED APPLICATIONS

This is a U.S. national stage of application No. PCT/EP2019/079061 filed 24 May 2019. Priority is claimed on Austrian Application No. A50936/2018 filed 31 Oct. 2018, the content of which is incorporated herein by reference in its entirety.

BACKGROUND OF THE INVENTION

1. Field of the Invention

The invention relates to a method for detecting a derailment state of a rail vehicle, where at least one kinematic variable is measured via a first sensor with respect to a first wheelset end portion and via a second sensor with respect to a second wheelset end portion and corresponding measurement signals are formed, processed, and evaluated.

2. Description of the Related Art

Rail vehicles must have a high level of driving safety. An accurate assessment and prediction of the technical states of vehicles, chassis and other vehicle components is therefore important. In particular, derailments of the rail vehicle can cause severe damage to humans and to the environment and to the rail vehicle itself, for which reason accurate and timely detection of a derailment state of the rail vehicle is important. For example, according to International Electrotechnical Commission (IEC) standard 62267, means for derailment detection are prescribed for automated train operation as per GoA 4 (Grade of Automation, Level 4).

WO 2004/101343 A1 discloses an exemplary method and apparatus for detecting a derailment of rail vehicle wheels. From measurement signals of an acceleration sensor, which is provided on a wheelset bearing of a rail vehicle, falling velocities of the rail vehicle wheels are determined via integration and a derailment is detected when a falling velocity exceeds a defined limit value. Furthermore, a detection of a derailment is also provided based on a falling velocity curve. In its known form, this approach has the disadvantage of inaccurate detection results.

SUMMARY OF THE INVENTION

In view of the foregoing, it is an object of the invention to provide a method that is further developed with respect to the prior art and that enables a better secured or more reliable detection of derailment states of a rail vehicle.

This and other objects and advantages are achieved in accordance with the invention by a method in which values of a first falling velocity with respect to the first wheelset end portion and values of a second falling velocity with respect to the second wheelset end portion are calculated from the measurement signals via at least one computing unit and a derailment state of the rail vehicle is detected via a first comparison operation of the first falling velocity and the second falling velocity with a first falling velocity limit value and a second falling velocity limit value, which is greater than the first falling velocity limit value, at least when the first falling velocity is equal to or greater than the first falling velocity limit value and the second falling velocity is equal to or greater than the second falling velocity limit value.

By detecting and evaluating kinematic information with respect to both wheelset ends, i.e., with respect to the first wheelset end portion and the second wheelset end portion, an advantageous safeguarding of detection results with respect to a derailment state of the rail vehicle is achieved. In a derailment operation, a first wheel of a wheelset first climbs onto a rail head and then slides off it. As a result of a geometric or kinematic interaction of track widths, wheel back distances and wheel profiles, a second wheel of the same wheelset then derails within a limited distance along the rails or within a limited period of time following the first wheel.

The derailment operation described is advantageously recorded using measurement technology as measurements are performed at both wheelset ends and falling velocities, i.e., the first falling velocity and the second falling velocity, are compared with two different falling velocity limit values, i.e., the first falling velocity limit value and the second falling velocity limit value.

The second falling velocity limit value relates to a subsequently derailing wheel and is greater than the first falling velocity limit value that is based on an initially derailing wheel.

If both a derailment in the direction of a rail outer side and a derailment in the direction of a rail inner side are determined in succession on the wheelset, then a derailment state of the wheelset or of the rail vehicle is detected. The inclusion of both wheels of the wheelset in the method in accordance with the invention reduces the risk of false alarms.

It is favorable that values of a first fall distance with respect to the first wheelset end portion and values of a second fall distance with respect to the second wheelset end portion are calculated via the at least one computing unit from the measurement signals, and via a second comparison operation of the first fall distance and the second fall distance with a first fall distance limit value and a second fall distance limit value, which is smaller than the first fall distance limit value, a derailment state of the rail vehicle is detected at least when the first fall distance is equal to or greater than the first fall distance limit value and the second fall distance is equal to or greater than the second fall distance limit value.

A detection of a derailment state of the rail vehicle is additionally safeguarded by including fall distances in the method according to the invention, i.e., the first fall distance with respect to the first wheel of the wheelset and the second fall distance with respect to the second wheel of the wheelset. The risk of false alarms with respect to a determination of derailment states is further reduced.

An increase in detection accuracy is also achieved if a derailment state of the rail vehicle is detected at least when the first falling velocity limit value and the second falling velocity limit value are reached or exceeded by the first falling velocity and the second falling velocity within a transition time or within a transition section distance.

This measure takes into account a coupling of a derailment of the first wheel with a derailment of the second wheel.

An advantageous embodiment is obtained when an emergency braking of the rail vehicle is triggered when a derailment state of the rail vehicle is detected. As a result of this measure, a safe state of the rail vehicle, its occupants, and its freight, etc. is restored as quickly as possible.

A favorable solution is achieved when information about a derailment state of the rail vehicle is transmitted via radio from the rail vehicle to a facility on the infrastructure side.

In the event of derailment of the rail vehicle, this measure enables rapid deployment of the emergency services for the recovery of the rail vehicle, supply of the occupants, etc. and replacement transport services, etc. to be set up.

Furthermore, it may also be advantageous when information about a derailment state of the rail vehicle is transmitted to a driver's cab of the rail vehicle and is output in the driver's cab.

This measures also informs a train driver immediately about the derailment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail hereinafter with reference to the exemplary embodiments, in which by way of example.

DETAILED DESCRIPTION OF THE EXEMPLARY EMBODIMENTS

Figure 1:
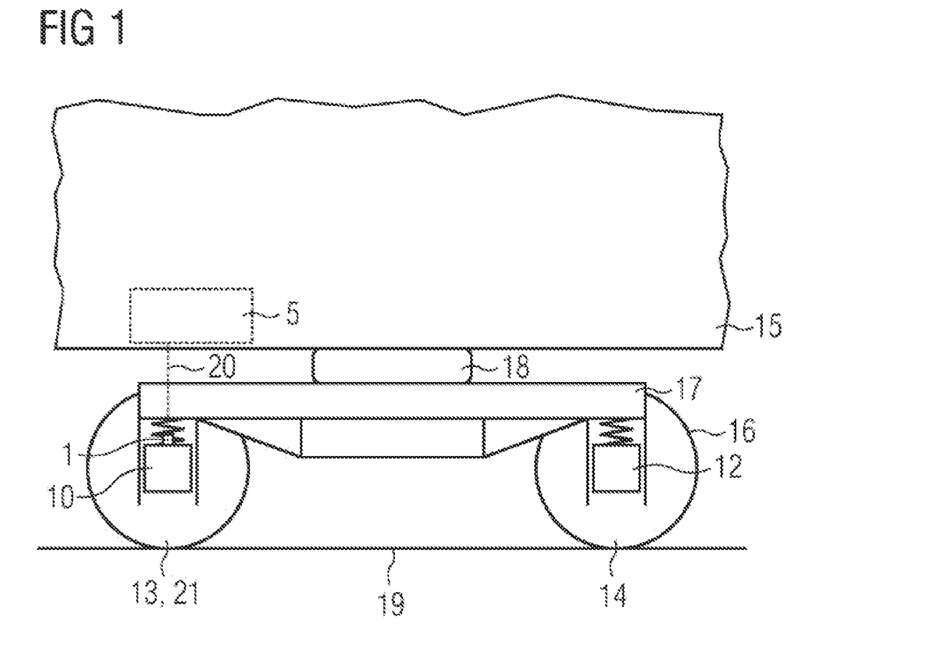
FIG. 1 shows a bogie of a rail vehicle with a first sensor and a second sensor and a railcar body of the rail vehicle with a computing unit, where the first sensor and the second sensor is connected to the computing unit in a signal-transmitting manner in accordance with the invention.

FIG. 1 shows an exemplary rail vehicle with a bogie 16 and a railcar body 15. The bogie 16 comprises a primary-sprung bogie frame 17 that is connected to a first wheelset 13 via a first wheelset bearing that has a first wheelset bearing housing 10 and via a second wheelset bearing that has a second wheelset bearing housing 11 (see FIG. 2), and to a second wheelset 14 via a third wheelset bearing that has a third wheelset bearing housing 12 and via a fourth wheelset bearing that has a fourth wheelset bearing housing.

A secondary spring apparatus 18, via which the bogie 16 is connected to the railcar body 15, is arranged on the bogie frame 17.

Figure 2:
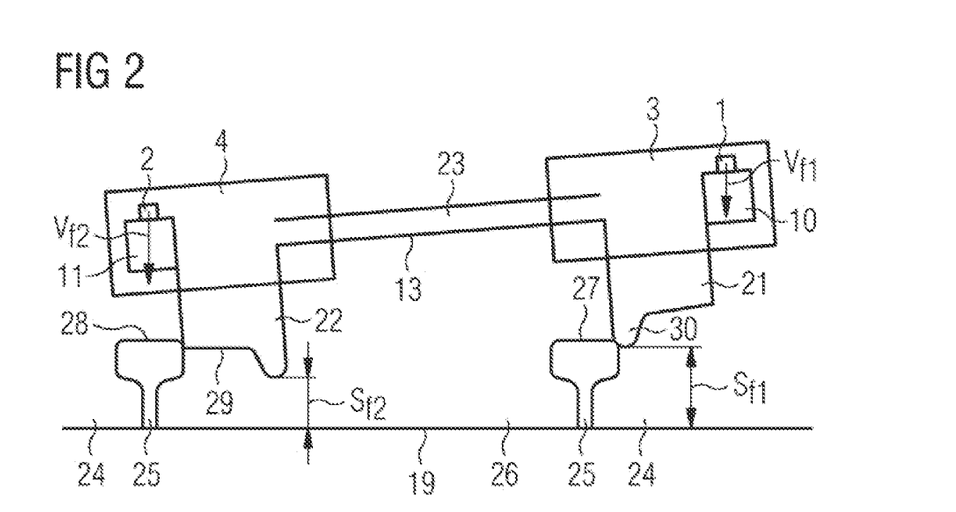
FIG. 2 shows a first wheelset of a rail vehicle during a derailment.

A first sensor 1 is provided on the first wheelset bearing housing 10, a second sensor 2, which can be seen in FIG. 2, on the second wheelset bearing housing 11. Furthermore, a third sensor is arranged on the third wheelset bearing housing 12 and a fourth sensor on the fourth wheelset bearing housing, although these are not shown.

With the first sensor 1 and the second sensor 2, derailments of the first wheelset 13 are determined, with the third sensor and the fourth sensor, derailments of the second wheelset 14 are determined.

The first sensor 1, the second sensor 2, the third sensor and the fourth sensor are designed as piezoelectric acceleration sensors which measure accelerations, i.e., a kinematic variable, of the rail vehicle in three spatial directions, where accelerations are also detected normal to a rail plane 19.

In accordance with the invention, however, it is also conceivable to form the first sensor 1, the second sensor 2, the third sensor and the fourth sensor as distance sensors, for example, as laser range finders, or as velocity sensors, for example, as Doppler radar sensors. In accordance with the invention, a mixed configuration is also conceivable, wherein for example, the first sensor 1 is formed as an acceleration sensor and the second sensor 2 is formed as a distance sensor or as a velocity sensor or the first sensor 1 is formed as a velocity sensor and the second sensor 2 is formed as a distance sensor, etc.

If none of the sensors are formed as a velocity sensor, then, as described in connection with FIG. 3, the accelerations or distances recorded via the sensors are transformed into falling velocity values.

Accelerations measured by the first sensor 1, the second sensor 2, the third sensor and the fourth sensor are transmitted as measurement signals via a first cable line 20, a second cable line (not shown), and a third cable line and a fourth cable line (not shown) to a computing unit 5 arranged in the railcar body 15, i.e., in a railcar, and evaluated therein for detecting derailment states of the rail vehicle.

The first sensor 1 is connected in a signal-transmitting manner to the computing unit 5 via the first cable line 20, the second sensor 2 via the second cable line, the third sensor via the third cable line and the fourth sensor via the fourth cable line.

The computing unit 5 is supplied with electricity via an on-board power network (not shown) of the rail vehicle. The computing unit 5 in turn supplies the first sensor 1, the second sensor 2, the third sensor and the fourth sensor with electricity via the first cable line 20, the second cable line, the third cable line and the fourth cable line.

In accordance with the invention, a signal transmission can also occur between the first sensor 1, the second sensor 2, the third sensor and the fourth sensor, on the one hand, and the computing unit 5, on the other hand, via a radio connection.

FIG. 2 shows an exemplary first wheelset 13 of a rail vehicle which is also shown in FIG. 1.

The first wheelset 13 has a first wheel 21 and a second wheel 22 that are connected to one another via a wheelset axle 23. To connect the first wheelset 13 to a bogie frame 17 illustrated in FIG. 1, a first wheelset bearing with a first wheelset bearing housing 10 and a second wheelset bearing with a second wheelset bearing housing 11 are provided.

A first sensor 1 is arranged on the first wheelset bearing housing 10, a second sensor 2 on the second wheelset bearing housing 11. The first sensor 1 and the second sensor 2 are formed as acceleration sensors and measure accelerations in three spatial directions, as a result of which, inter alia, accelerations normal to a rail plane 19 are detected. The first sensor 1 measures accelerations with respect to a first wheelset end portion 3 or with respect to the first wheelset bearing housing 10, the second sensor 2 measures accelerations with respect to a second wheelset end portion 4 or with respect to the second wheelset bearing housing 11.

The first sensor 1 and the second sensor 2 therefore measure a kinematic variable, i.e., the acceleration with respect to the first wheelset end portion 3 and the second wheelset end portion 4.

In accordance with the invention, however, it is also conceivable to measure further or other kinematic variables, for example, velocities via a velocity sensor or distances between the first wheelset via a distance sensor.

The first wheelset end portion 3 and the second wheelset end portion 4 are edge sections of the first wheelset 13 and, viewed in the longitudinal direction of the first wheelset 13, each comprise approximately 30% of the first wheelset 13.

From acceleration measurement signals of the first sensor 1 and the second sensor 2, falling velocity values of the first wheelset 13 are determined in a computing unit 5 shown in FIG. 1 via a first integration process 8 described in connection with FIG. 3, i.e., values of a first falling velocity $v_{f1}$ with respect to the first wheelset end portion 3 or the first wheelset bearing housing 10 and values of a second falling velocity $v_{f2}$ with respect to the second wheelset end portion 4 or the second wheelset bearing housing 11. The first falling velocity $v_{f1}$ and the second falling velocity $v_{f2}$ are speeds normal to the rail plane 19.

FIG. 2 shows a derailed state of the rail vehicle. The first wheel 21 derails in the direction of an outer side 24 of a track 25, the second wheel 22 in the direction of an inner side 26 of the track 25.

The first falling velocity $v_{f1}$ is less than the second falling velocity $v_{f2}$, but greater than a first falling velocity limit value $v_{g1}$. The second falling velocity $v_{f2}$ exceeds a second falling velocity limit value $v_{g2}$, which is greater than the first falling velocity limit value $v_{g1}$. The second falling velocity limit value $v_{g2}$ is therefore greater than the first falling velocity limit value $v_{g1}$ as the second wheel 22 derails following the first wheel 21, which climbs onto a first rail head 27, and as a consequence a greater preload of a primary suspension acts on the second wheel 22 than on the first wheel 21.

In the computing unit 5, via a second integration process 9 described in connection with FIG. 3, values of a first fall distance $s_{f1}$ are determined from the values of the first falling velocity $v_{f1}$ and values of a second fall distance $s_{f2}$ from the values of the second falling velocity $v_{f2}$.

The first fall distance $s_{f1}$ is a distance of the first wheelset end portion 3 or the first wheelset bearing housing 10 normal to the rail plane 19, and the second fall distance $s_{f2}$ is a distance of the second wheelset end portion 4 or the second wheelset bearing housing 11 normal to the rail plane 19.

As the first wheel 21 with its wheel flange 30 climbs onto the first rail head 27 and only subsequently slides down, while the second wheel 22 slides directly over its running surface 29 from a second rail head 28, at the end of a derailment of the first wheelset 13, the total first fall distance $s_{f1}$ covered is greater than the total second fall distance $s_{f2}$ covered.

Accordingly, a first fall distance limit value $s_{g1}$ is defined as greater than a second fall distance limit value $s_{g2}$.

A first comparison operation 6, also described in connection with FIG. 3, for comparing the first falling velocity $v_{f1}$ and the second falling velocity $v_{f2}$ with the first falling velocity limit value $v_{g1}$ and the second falling velocity limit value $v_{g2}$ as well as a second comparison operation 7, also explained in connection with FIG. 3, for comparing the first fall distance $s_{f1}$ and the second fall distance $s_{f2}$ with the first fall distance limit value $s_{g1}$ and the second fall distance limit value $s_{g2}$ are performed in the computing unit 5.

A derailed state of the first wheelset 13 or the rail vehicle is detected when the first falling velocity $v_{f1}$ is equal to or greater than the first falling velocity limit value $v_{g1}$, the second falling velocity $v_{f2}$ is equal to or greater than the second falling velocity limit value $v_{g2}$, the first fall distance $s_{f1}$ is equal to or greater than the first fall distance limit value $s_{g1}$ and the second fall distance $s_{f2}$ is equal to or greater than the second fall distance limit value $s_{g2}$.

The inclusion of the second comparison operation 7 is a particularly favorable solution. in accordance with the invention, however, it is also conceivable to dispense with a determination and evaluation of the first fall distance $s_{f1}$ and the second fall distance $s_{f2}$ and to detect a derailment state of the rail vehicle based solely on the first comparison operation 6, i.e., based on falling velocities.

It should be understood the method in accordance with the invention is also established to detect a derailment state of the rail vehicle in which the second wheel 22 derails in the direction of the outer side 24 of the track 25 and the first wheel 21 in the direction of the inner side 26 of the track 25.

Figure 3:
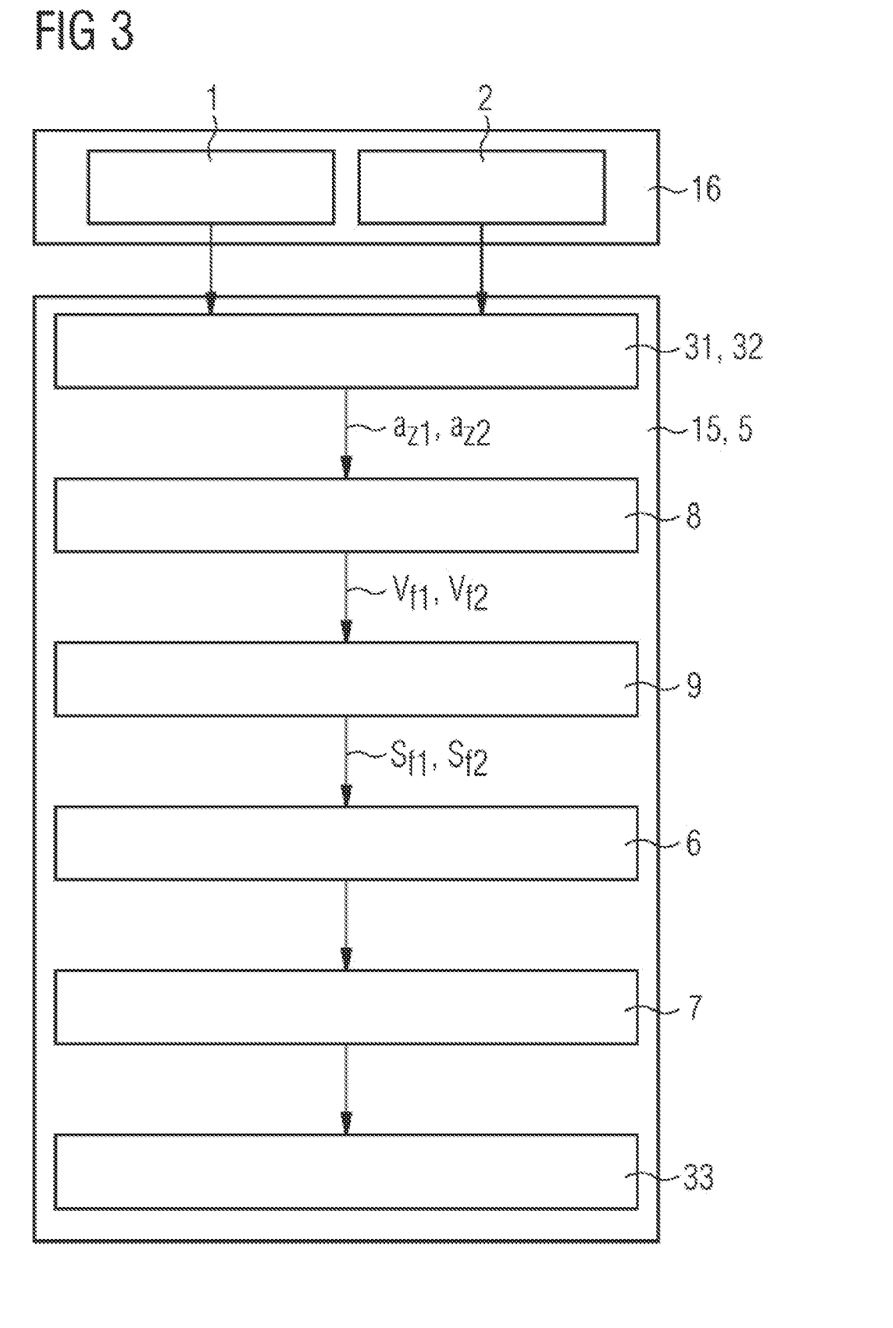
FIG. 3 is a flow chart of an exemplary embodiment of a method in accordance with the invention for detecting derailment states of a rail vehicle.

FIG. 3 discloses a flow chart of an exemplary embodiment of a partially computer-implemented method in accordance with the invention for derailment detection for a rail vehicle.

From a first sensor 1 and a second sensor 2, which are formed as acceleration sensors and, as shown in FIG. 1 or FIG. 2, are arranged on a bogie 16 of the rail vehicle, accelerations are detected in all spatial directions, i.e., also normal to a rail plane 19 likewise shown in FIG. 1 or FIG. 2.

As shown in FIG. 2, these accelerations relate to a first wheelset end portion 3 of a first wheelset 13 with a first wheel 21 and a second wheel 22 as well as a second wheelset end portion 4 of the first wheelset 13 and, as shown in FIG. 1, are transmitted as measurement signals via a first cable line 20 and a second cable line to a computing unit 5 arranged in a railcar body 15 of the rail vehicle.

Signal processing 31 and signal evaluation 32 occurs in the computing unit 5. Acceleration information is extracted from the measurement signals and transformed into acceleration components, inter alia, into an acceleration component normal to the rail plane 19. Furthermore, the measurement signals are filtered via the signal evaluation 32 to eliminate low-frequency interference which may be caused, for example, by drift phenomena and electromagnetic interference. A Bessel or high-pass filter known from the prior art is used for this purpose.

Accelerations measured by the first sensor 1 and related to the first wheelset end portion 3 normal to the rail plane 19, first z-accelerations $a_{z1}$, are then integrated via a first integration process 8 in accordance with a first formation rule over a derailment period $t_e$:

$$\int_{t_{a1}}^{t_e} a_{z1} \cdot dt = \int_{v_{z01}}^{v_{f1}} dv_{z1}$$

In addition to the first z-acceleration $a_{z1}$ and the derailment period $t_e$, the first formation rule also comprises a time t, a first start time $t_{01}$, a first z-speed $v_{z1}$ of the first wheelset end portion 3 normal to the rail plane 19 and a first z-start speed $v_{z01}$ of the first wheelset end portion 3 normal to the rail plane 19. The first start time $t_{01}$ and the first z-start speed $v_{zo1}$ are used accordingly, for example, at the start of the method in accordance with the invention with $t_{01}=0$ and $v_{z01}=0$, other start values being understood as also conceivable.

The first integration process 8 also relates to a second formation rule, in accordance with which accelerations detected by the second sensor 2 and related to the second wheelset end portion 4, second z-accelerations az2, are integrated normal to the rail plane 19:

$$\int_{t_{a1}}^{t_e} a_{z2} \cdot dt = \int_{v_{z02}}^{v_{f2}} dv_{z2}$$

In addition to the second z-acceleration $a_{z2}$ and the derailment period $t_e$, the second formation rule also comprises the time t, a second start time $t_{02}$, a second z-speed $v_{Z2}$ of the second wheelset end portion 4 normal to the rail plane 19 and a second z-start speed $v_{Z02}$ of the second wheelset end portion 4 normal to the rail plane 19. The second start time $t_{02}$ and the second z-start speed $v_{Z02}$ are used accordingly, for example, at the start of the method in accordance with the invention with $t_{02}=0$ and $v_{Z02}=0$, other start values being understood as also being conceivable.

The derailment period $t_e$ is an empirical variable that is determined via simulations and/or operational observations from a plurality of analyses of derailment operations of rail vehicles. It relates to a maximum duration of a derailment operation of a wheel.

In accordance with the invention, however, it is also conceivable to relate the derailment period $t_e$ to a period of time from which a derailment of a wheel can be assumed with certainty, where this period of time is less than the maximum period of time of a derailment operation. Furthermore, it is conceivable to provide a first derailment period for the first formation rule and a second derailment period for the second formation rule, which have different values.

In the present exemplary embodiment the method in accordance with the invention, the derailment period $t_e$ is 3 s, other amounts being understood as also being conceivable.

A first falling velocity $v_{f1}$ related to the first wheelset end portion 3 is determined from the first rule.

A second falling velocity $v_{f2}$ related to the second wheelset end portion 4 is determined from the second rule.

Furthermore, a second integration process 9 is performed via which a first fall distance $s_{f1}$ is determined from the first falling velocity $v_{f1}$ and a second fall distance $s_{f2}$ from the second falling velocity $v_{f2}$.

A third formation rule for determining the first fall distance $s_{f1}$ by means of time-free integration is as follows:

$$\int_{S_{z01}}^{S_{f1}} a_{z1} \cdot ds_{z1} = \int_{v_{z01}}^{v_{f1}} v_{z1} \cdot dv_{z1}$$

In addition to parameters already known from the first formation rule, the third formation rule comprises a first z-distance $s_{z1}$ normal to the rail plane 19 and a first z-start distance $s_{z01}$ of the first wheelset end portion 3 normal to the rail plane 19 as an integration limit, which is set at the beginning of the method according to the invention $s_{z01}=0$, other start values also being conceivable, however.

A fourth formation rule for determining the second fall distance $s_{f2}$ via time-free integration is as follows:

$$\int_{S_{z02}}^{S_{f2}} a_{z2} \cdot ds_{z2} = \int_{v_{z02}}^{v_{f2}} v_{z2} \cdot dv_{z2}$$

In addition to parameters already known from the second formation rule and the third formation rule, the fourth formation rule comprises a second z-distance $s_{Z2}$ of the second wheelset end portion 4 normal to the rail plane 19 and a second z-start distance $s_{Z02}$ of the second wheelset end portion 4 normal to the rail plane 19 as an integration limit which is set at the beginning of the method in accordance with the invention $s_{Z02}=0$, other start values also being conceivable, however.

In accordance with the invention, instead of the time-free integrations for forming the first fall distance $s_{f1}$ and the second fall distance $s_{f2}$, it is also conceivable to determine the first fall distance $s_{f1}$ and the second fall distance $s_{f2}$ via double temporal integrations over the derailment period $t_e$ from the first z-acceleration $a_{z1}$ and the second z-acceleration $a_{z2}$.

The first integration process 8 with the first formation rule and the second formation rule and the second integration process 9 with the third formation rule and the fourth formation rule are carried out numerically via the computing unit 5, where for the first z-speed $v_{z1}$, the second z-speed $v_{z2}$, the first z-distance $s_{z1}$ and the second z-distance $s_{z2}$ for each time step intermediate results are calculated which, in turn, are used as the first z-start speed $v_{z01}$, second z-start speed $v_{Z02}$, first z-start distance $s_{z01}$ and second s-start distance $s_{Z02}$ for a second round of integration chronologically following a first round of integration.

In the present exemplary embodiment the method in accordance with the invention, intermediate results mentioned above are also used for detecting derailment states of the rail vehicle, i.e., compared with a first falling velocity limit value $v_{g1}$, a second falling velocity limit value $v_{g2}$, a first fall distance limit value $s_{g1}$ and a second fall distance limit value $s_{g2}$, and are therefore likewise considered as first falling velocities $v_{f1}$, second falling velocities $v_{f2}$, first fall distances $s_{f1}$ and second fall distances $s_{f2}$.

A first comparison operation 6 is performed in which the first falling velocity $v_{f1}$ is compared with the first falling velocity limit value $v_{g1}$ and the second falling velocity limit value $v_{g2}$ and the second falling velocity $v_{f2}$ is also compared with the first falling velocity limit value $v_{g1}$ and the second falling velocity limit value $v_{g2}$.

The first falling velocity limit value $v_{g1}$ with an amount of 3 m/s refers, as shown in FIG. 2, to a derailment of the first wheel 21 in the direction of an outer side 24 of a track 25, and is smaller than the second falling velocity limit value $v_{g2}$ which, as also illustrated in FIG. 2, refers to a derailment of the second wheel 22 in the direction of an inner side 26 of the track 25 and is 4 m/s.

The first falling velocity limit value $v_{g1}$ and the second falling velocity limit value $v_{g2}$ are empirically determined via simulations and/or operational observations from a plurality of analyses of derailment operations of rail vehicles. Depending on the rail vehicle and its operation as well as a railway infrastructure, different amounts, i.e., including different amounts to those listed above, can be used for the first falling velocity limit value $v_{g1}$ and the second falling velocity limit value $v_{g2}$.

Furthermore, a second comparison operation 7 is performed in which the first fall distance $s_{f1}$ is compared with the first fall distance limit value $s_{g1}$ and the second fall distance limit value $s_{g2}$ and the second fall distance $s_{f2}$ is likewise compared with the first fall distance limit value $s_{g1}$ and the second fall distance limit value $s_{g2}$.

In this exemplary embodiment of the method in accordance with the invention, the first fall distance limit value $s_{g1}$ is 210 mm and refers to a derailment of the first wheel 21 in the direction of the outer side 24 of the track 25, while the second fall distance limit value $s_{g2}$, which in this exemplary embodiment of the method in accordance with the invention is 180 mm, refers to a derailment of the second wheel 22 in the direction of the inner side 26 of the track 25.

The second fall distance limit value $s_{g2}$ is determined from a rail height, the first fall distance limit value $s_{g1}$ furthermore from a wheel flange height.

Depending on the rail vehicle and infrastructure, amounts other than those listed above can of course be used for the first fall distance limit value $s_{g1}$ and the second fall distance limit value $s_{g2}$.

The first falling velocity $v_{f1}$, the second falling velocity $v_{f2}$ and the first fall distance $s_{f1}$ and the second fall distance $s_{f2}$ define downward movements and are defined with positive signs. The first falling velocity limit value $v_{g1}$, the second falling velocity limit value $v_{g2}$, the first fall distance limit value $s_{g1}$ and the second fall distance limit value $s_{g2}$ are likewise defined with positive signs.

A derailment state of the rail vehicle is detected when the first falling velocity $v_{f1}$ is equal to or greater than the first falling velocity limit value $v_{g1}$, the second falling velocity $v_{f2}$ is equal to or greater than the second falling velocity limit value $v_{g2}$, the first fall distance $s_{f1}$ is equal to or greater than the first fall distance limit value $s_{g1}$ and the second fall distance $s_{f2}$ is equal to or greater than the second fall distance limit value $s_{g2}$.

As a result, a derailed state of the rail vehicle is also detected if, in addition to the second falling velocity $v_{f2}$, the first falling velocity $v_{f1}$ is equal to or greater than the second falling velocity limit value $v_{g2}$ and/or in addition to the first fall distance $s_{f1}$, the second fall distance $s_{f2}$ is also equal to or greater than the first fall distance limit value $s_{g1}$.

Beyond the first comparison operation 6 or the second comparison operation 7, for a detection of a derailment state of the rail vehicle, the first falling velocity limit value $v_{g1}$ and the second falling velocity limit value $v_{g2}$ or the first fall distance limit value $s_{g1}$ and the second fall distance limit value $s_{g2}$ must be reached or exceeded by the first falling velocity $v_{f1}$ and the second falling velocity $v_{f2}$ or the first fall distance $s_{f1}$ and the second fall distance $s_{f2}$ within a transition time $t_u$ and within a transition section distance $s_u$ of the rail vehicle correlating with the transition time $t_u$. Accordingly, a derailment of the first wheel 21 must be linked to a derailment of the second wheel 22 in terms of time and location.

The transition time $t_u$ is empirically determined via simulations and/or operational observations from a plurality of analyses of derailment operations of rail vehicles. The transition section distance $s_u$ is determined by multiplying a travel speed of the rail vehicle by the transition time $t_u$.

In this exemplary embodiment of the method in accordance with the invention, a transition time $t_u$ of 10 s is used, with other amounts for the transition time $t_u$ also being conceivable in accordance with the invention.

If, for example, both the first falling velocity $v_{f1}$ and the second falling velocity $v_{f2}$ are smaller than the second falling velocity limit value $v_{g2}$ and/or both the first fall distance $s_{f1}$ and the second fall distance $s_{f2}$ are smaller than the first fall distance limit value $s,_{g1}$, then no derailment state of the rail vehicle is present and no derailment state is detected.

Furthermore, for example, no derailment state is present, and no derailment state is detected if the first falling velocity $v_{f1}$ or the second falling velocity $v_{f2}$ is smaller than the first falling velocity limit value $v_{g1}$ and/or the first fall distance $s_{f1}$ or the second fall distance $s_{f2}$ is smaller than the second fall distance limit value $s_{g2}$.

It is, of course, possible that that side of the first wheelset 13 with the first wheelset end portion 3 or the first wheel 21 derails in the direction of the inner side 26 of the track 25 and that side of the first wheelset 13 with the second wheelset end portion 4 or the second wheel 22 derails in the direction of the outer side 24 of the track 25, i.e., vice versa, as illustrated for this exemplary embodiment of the method in accordance with the invention. To check such a scenario, which is likewise always performed in the scenario in accordance with the invention, the second wheelset end portion 4 is regarded as the first wheelset end portion 3 and the first wheelset end portion 3 as the second wheelset end portion 4. This scenario is checked in accordance with the scheme described in connection with FIG. 3.

Including the second comparison operation 7 in the method in accordance with the invention is a particularly favorable solution. In accordance with the invention, however, it is also conceivable to dispense with a determination and evaluation of the first fall distance $s_{f1}$ and the second fall distance $s_{f2}$ and to detect a derailment state of the rail vehicle solely on the basis of the first comparison operation 6.

Measurements of the accelerations, the signal processing 31, the signal evaluation 32, the first integration process 8, the second integration process 9, the first comparison operation 6, the second comparison operation 7, data transmissions required for individual method steps, and generation of information about a possible derailment state of the first wheelset 13 or the rail vehicle are performed continuously during the operation of the rail vehicle at a frequency of 10 Hz.

In accordance with the invention, it should be understood it is also possible to provide a different frequency, to vary the frequency or to perform different method steps with different frequencies.

Method steps, such as the first integration process 8 and the second integration process 9 or the first comparison operation 6 and the second comparison operation 7, can be performed sequentially or in parallel.

In a detected derailment state, emergency braking of the rail vehicle is triggered (emergency brake trigger 33). For this purpose, the computing unit 5 is connected to a brake apparatus of the rail vehicle (not shown) for this exemplary embodiment of the method in accordance with the invention to a brake control device.

Furthermore, the rail vehicle has a vehicle antenna (not shown) to which the computing unit 5 is connected and via which information about a derailment state of the rail vehicle is transmitted to a facility on the infrastructure side, not shown, for this exemplary embodiment of the method in accordance with the invention to a control center.

In accordance with the invention, it is also conceivable to connect the computing unit 5 via corresponding network cables to an output unit, in other words, for example with a display and/or an audio system, in a driver's cab of the rail vehicle and to output information about a derailment state visually and/or acoustically to a train driver.

It should be understood the method in accordance with the disclosed embodiments of the invention can be used both for rail vehicles with wheelset bogies and for rail vehicles with loose-wheel bogies or loose wheelsets, as are provided, for example, for low-floor streetcars. No mechanical coupling is required between the first wheel 21 and the second wheel 22.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for detecting a derailment state of a rail vehicle, the apparatus comprising:
   a first sensor provided on a first wheelset bearing housing of a first wheelset of the rail vehicle,
   a second sensor arranged on a second wheelset bearing housing of the first wheelset; and
   at least one computing unit provided in or on a railcar of the rail vehicle;
   wherein the first sensor, the second sensor and the at least one computing unit are operatively interconnected;
   wherein at least one kinematic variable is measured via the first sensor with respect to a first wheelset end portion and via the second sensor with respect to a second wheelset end portion, corresponding measurement signals being formed, processed and evaluated by the at least one computing unit;
   wherein the at least one computing unit is configured to:
      calculate values of a first falling velocity with respect to the first wheelset end portion and calculate values of a second falling velocity with respect to the second wheelset end portion from the measurement signals; and
      detect a derailment state of the rail vehicle via a first comparison operation of the first falling velocity with a first falling velocity limit value and via the first comparison operation of the second falling velocity with a second falling velocity limit value which is greater than the first falling velocity limit value, at least when the first falling velocity is equal to or greater than the first falling velocity limit value and the second falling velocity is equal to or greater than the second falling velocity limit value; and
   wherein the second falling velocity limit value relates to a subsequent derailing and the first falling velocity limit value is based on an initially derailing wheel.

2. The apparatus as claimed in claim 1, wherein the at least one computing unit is connected to a brake apparatus of the rail vehicle.

3. The apparatus as claimed in claim 2, wherein the at least one computing unit is connected to a vehicle antenna of the rail vehicle.

4. The apparatus as claimed in claim 3, wherein the at least one computing unit is connected to an output unit upon which information about a derailment state of the rail vehicle can be output.

5. The apparatus as claimed in claim 2, wherein the at least one computing unit is connected to an output unit upon which information about a derailment state of the rail vehicle can be output.

6. The apparatus as claimed in claim 1, wherein the at least one computing unit is connected to a vehicle antenna of the rail vehicle.

7. The apparatus as claimed in claim 1, wherein the at least one computing unit is connected to an output unit upon which information about a derailment state of the rail vehicle can be output.

8. The apparatus as claimed in claim 1, wherein at least the first sensor is formed as an acceleration sensor.

9. The apparatus as claimed in claim 1, wherein at least the first sensor is formed as a distance sensor.

10. The apparatus as claimed in claim 1, wherein at least the first sensor is formed as a velocity sensor.

11. A method for detecting a derailment state of a rail vehicle, at least one kinematic variable being measured via a first sensor with respect to a first wheelset end portion and via a second sensor with respect to a second wheelset end portion and corresponding measurement signals being formed, processed and evaluated, the method comprising:
   calculating values of a first falling velocity with respect to the first wheelset end portion and calculating values of a second falling velocity with respect to the second wheelset end portion from the measurement signals via at least one computing unit; and
   detecting a derailment state of the rail vehicle via a first comparison operation of the first falling velocity with a first falling velocity limit value and via the first comparison operation of the second falling velocity with a second falling velocity limit value which is greater than the first falling velocity limit value, at least when the first falling velocity is equal to or greater than the first falling velocity limit value and the second falling velocity is equal to or greater than the second falling velocity limit value;
   wherein the second falling velocity limit value relates to a subsequent derailing and the first falling velocity limit value is based on an initially derailing wheel.

12. The method as claimed in claim 11, wherein values of a first fall distance with respect to the first wheelset end portion and values of a second fall distance with respect to the second wheelset end portion are calculated from the measurement signals via at least one computing unit and a derailment state of the rail vehicle is detected at least via a second comparison operation of the first fall distance and the second fall distance with a first fall distance limit value and a second fall distance limit value, which is smaller than the first fall distance limit value, when the first fall distance is equal to or greater than the first fall distance limit value and the second fall distance is equal to or greater than the second fall distance limit value.

13. The method as claimed in claim 12, wherein a derailment state of the rail vehicle is detected at least when the first falling velocity limit value and the second falling velocity limit value is reached or exceeded by the first falling velocity and the second falling velocity within a transition time or within a transition section distance.

14. The method as claimed in claim 12, wherein a derailment state of the rail vehicle is detected when the first fall distance limit value and the second fall distance limit value is reached or exceeded by the first fall distance and the second fall distance within the transition time or within the transition section distance.

15. The method as claimed in claim 12, wherein at least the first fall distance is determined via a second integration process.

16. The method as claimed in claim 15, wherein the second integration process is performed as a time-free integration.

17. The method as claimed in claim 11, wherein a derailment state of the rail vehicle is detected at least when the first falling velocity limit value and the second falling velocity limit value is reached or exceeded by the first falling velocity and the second falling velocity within a transition time or within a transition section distance.

18. The method as claimed in claim 11, wherein at least the first falling velocity is determined via a first integration process of an acceleration over a derailment period.

19. The method as claimed in claim 11, wherein emergency braking of the rail vehicle is triggered when a derailment state of the rail vehicle is detected.

20. The method as claimed in claim 11, wherein information about a derailment state of the rail vehicle is transmitted by radio from the rail vehicle to a facility on the infrastructure side.

21. The method as claimed in claim 11, wherein information about a derailment state of the rail vehicle is transmitted to a driver's cab of the rail vehicle and output in the driver's cab.

* * * * *